(12) United States Patent
Martinez

(10) Patent No.: US 7,528,356 B2
(45) Date of Patent: May 5, 2009

(54) METHOD AND SYSTEM FOR OPTICAL DISTANCE AND ANGLE MEASUREMENT

(75) Inventor: Steven David Martinez, Albuquerque, NM (US)

(73) Assignee: Honeywell International Inc., Morristown, NJ (US)

(*) Notice: Subject to any disclaimer, the term of this patent is extended or adjusted under 35 U.S.C. 154(b) by 765 days.

(21) Appl. No.: 11/231,268

(22) Filed: Sep. 20, 2005

(65) Prior Publication Data

US 2009/0087134 A1    Apr. 2, 2009

Related U.S. Application Data

(63) Continuation-in-part of application No. 10/206,438, filed on Jul. 26, 2002, which is a continuation-in-part of application No. 09/476,392, filed on Dec. 30, 1999, now Pat. No. 6,426,497.

(51) Int. Cl.
*G01D 5/34* (2006.01)
(52) U.S. Cl. ............... 250/213.13; 250/213.14; 73/650
(58) Field of Classification Search ............ 250/231.13, 250/231.14, 231.16–231.18, 237 G, 227.11, 250/227.28, 559.29, 559.38; 341/13, 31; 73/650
See application file for complete search history.

(56) References Cited

U.S. PATENT DOCUMENTS

| | | | |
|---|---|---|---|
| 5,404,226 | A | 4/1995 | Kellner |
| 5,438,882 | A | 8/1995 | Karim-Panahi et al. |
| 5,612,544 | A | 3/1997 | Busch |
| 5,734,108 | A | 3/1998 | Walker et al. |
| 6,426,497 | B1 | 7/2002 | Martinez et al. |

FOREIGN PATENT DOCUMENTS

| | | |
|---|---|---|
| DE | 36 09 211 A | 9/1987 |
| DE | 4402401 A1 | 3/1995 |
| JP | 56130603 | 10/1981 |
| JP | 60044806 A * | 3/1985 |
| WO | WO 95/23325 | 8/1995 |

(Continued)

OTHER PUBLICATIONS

Patent Abstracts of Japan, vol. 008, No. 179, p. 295, Aug. 17, 1984.

(Continued)

*Primary Examiner*—Kevin Pyo
(74) *Attorney, Agent, or Firm*—McDonnell Boehnen Hulbert & Berghoff LLP

(57) ABSTRACT

A contactless precision, optical distance and angle measurement method and system optically measuring the position of a moveable object, the bending of the object, the torque applied to the object and the object's rotational velocity. The present invention includes a plurality of sectioned fiber optic placed around and adjacent to the moveable object that transmits optical signals to a surface of the object and receives the optic signals when a predefined marker or a reflective area is sensed. Another embodiment utilizes a sectioned optical assembly which, via alternate means, produces equivalent optical measurements. The received optic signals are then processed using mathematical computations that are facilitated through pre-characterization of the sensor response against a reflective material identical to that of the marker or reflective area.

17 Claims, 12 Drawing Sheets

FOREIGN PATENT DOCUMENTS

| WO | WO 01 50085 A | 7/2001 |
|---|---|---|
| WO | WO 2004/011878 A | 2/2004 |

OTHER PUBLICATIONS

Patent Abstracts of Japan, vol. 009, No. 167; p. 372, Jul. 12, 1985.

Booysen, Andre; Swart, Pieter; Lacquit, Beatrys; Spammer, Stephanus; "Wavelength Insensitive Fiber Optic Sensor Based On Axially Strained Fused Coupler," pp. 2788-2792; Oct. 1996; Society of Photo-Optical Instrumentation Engineers 35(10).

Warashina, Yoshihisa; Iida, Takashi; Ikeya, Tsuyoshi; Kyomasu, Mikio; "Single-mode Fiber-compatible Plastic-molded Surface-Contact Receptacles," pp. 3110-3116; Nov. 1996; Society of Photo-Optical Instrumentation Engineers 35(11).

Beadle, Brad M.; Weis, R. Stephen; Norwood, Curt A.; "Radial Strain-induced Attenuation in Plastic Optical Fiber," pp. 1696-1699; Jun. 1996; Opt Eng. 35(6).

Wang, Dong-Xue; Karim, Mohammid A.; "Self-referenced Fiber Optic Sensor Performance for Microdisplacement Measurement;" pp. 838-842; Mar. 1997; Society of Photo-Optical Instrumentation Engineers 36(3).

Morante, Miguel; Cobo, Adolfo; Lopez-Higuera, Jose Miguel; "New Approach Using A Bare Fiber Optic Cantilever Beam As A Low-Frequency Acceleration Measuring Element," pp. 1700-1706; Jun. 1996; Society of Photo-Optical Instrumentation Engineers 35(6).

Su, Wei; Gilbert, John A.; Morrissey, Mark D.; Song, Yuehong; "General-purpose Photoelastic Fiber Optic Accelerometer," pp. 22-28; Jan. 1997; Society of Photo-Optical Instrumentation Engineers 35(1).

Remo, John L.; "Solid State Optic Vibration/Displacement Sensors," pp. 2798-2803; Oct. 1996, Society of Photo-Optical Instrumentation Engineers.

Locke, R. J.; Hicks, Y.R., Anderson, R.C., Zaller, M.M.; "Fuel Injector Patternation Evaluation In Advanced Liquid-Fueled, High Pressure, Gas Turbine Combustors, Using Nonintrusive Optical Diagnostic Techniques," Oct. 1997; pp. 1-15; NASA Tech Briefs LEW-16701.

Rosakis, A. J.; Singh, R. P.; Tsuji, Y.; Kolawa, E.; Moore, Jr., N. R.; "Full Field Measurements of Curvature Using Coherent Gradient Sensing: Application To Thin Film Characterization;" pp. 1-40; Aug. 1998, NASA Tech Brief vol. 22, No. 8.

Yao, Shi-Kay; Asawa, Charles K.; "Fiber Optical Intensity Sensors;" pp. 562-575; Apr. 1983; IEEE Journal vol. SAC-1, No. 3.

Gallawa, R. L.; Goyal, I.C.; Ghatak, A. K.; "Fiber Spot Size: A Simple Method of Calculation;" pp. 192-197; Feb. 1993; Journal of Lightwave Technology, vol. 11, No. 2.

Rose, A. H.; Wyss, J. C.; "Self-Calibrating Optical Thermometer," pp. 142-148; SPIE vol. 2594.

Metz, Sara; Young, Matt (eds.); "Bibliography of NIST Publications on Multimode Optical Fibers," pp. 1-23; Dec. 1997; NISTIR 5070; National Institute of Standards and Technology.

Wang, C.M.; Vecchia, Dominic F.; Young, Matt; Brilliant, Nathan A.; "Software for Performing Gray-Scale Measurements of Optical Fiber End Faces," pp. 1-18; Nov. 1994; NIST Technical Note 1370, National Institute of Standards and Technology.

Day, G.W.; Franzen, D.L.; Hickernell, R.K. (eds.); "Technical Digest: Symposium on Optical Fiber Measurements, 1994," pp. 1-219; Sep. 1994; NIT Special Publication 864; National Institue of Standards and Technology.

Day, G. W.; Hale, P.D.; Deeter, M.; Milner, T.E.; Conrad, D.; Etzel, S.M.; "Limits to the Precision of Electro-Optic and Magneto-Optic Sensors," pp. 1-128; Mar. 1987; NBS/TN 1307; National Institute of Standards and Technology.

"Optical Power Line Voltage and Current Measurement Systems, Vol. 1," Sep. 1987; EPRI EL 5431; National Bureau of Standards.

International Search Report for 06120980.5—2213 dated Jan. 19, 2007.

* cited by examiner

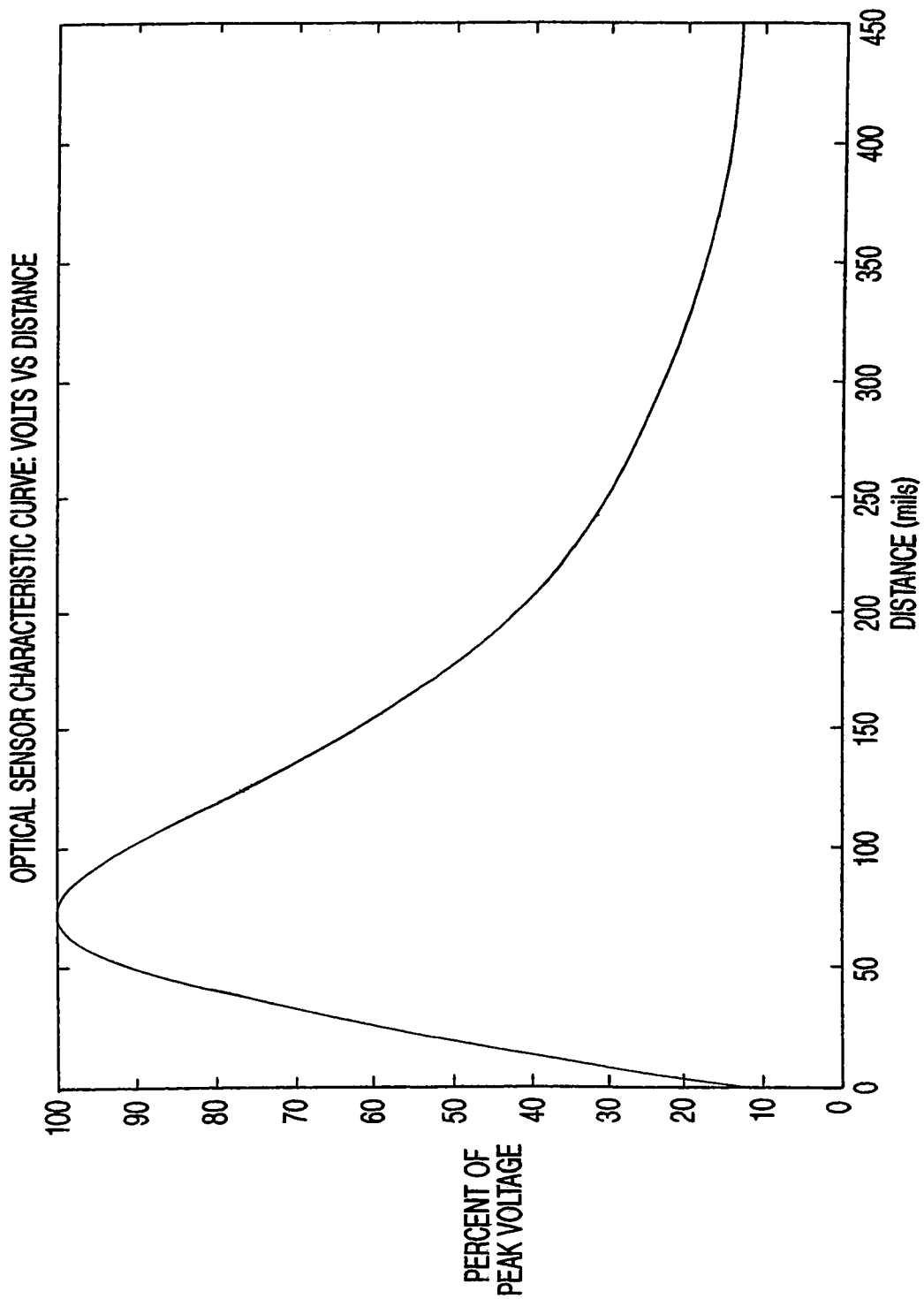

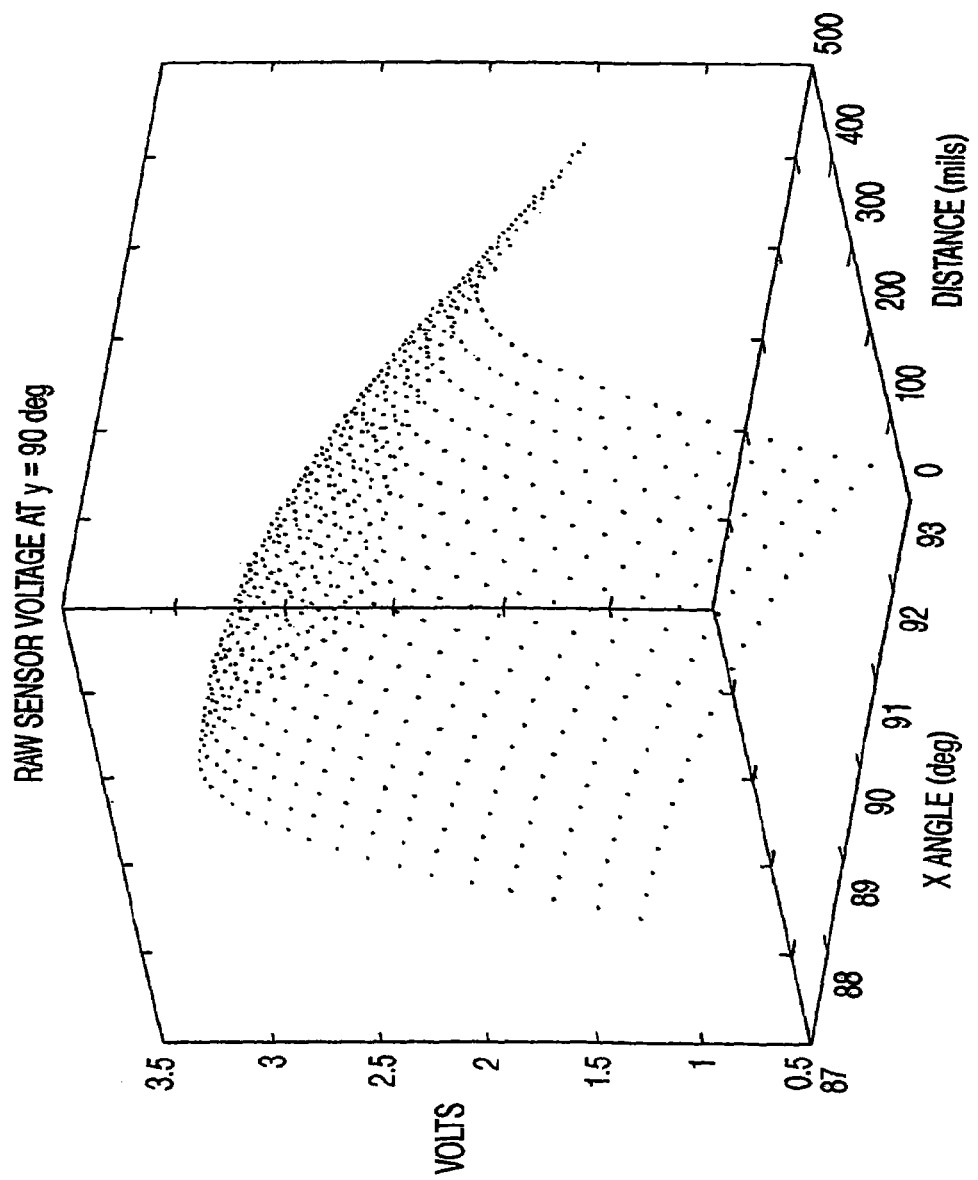

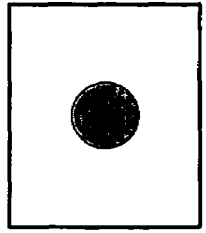 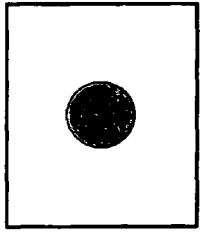 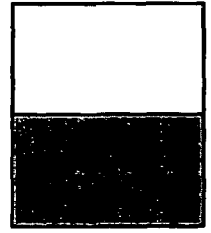 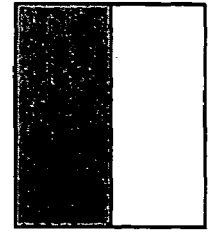 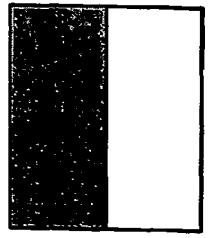
Figure 11b: 508 S0: mirror 20% reflective in hatched area
Figure 11c: 509 S1: mirror 100% reflective in hatched area
Figure 11d: 510 S2: mirror 100% reflective in hatched area
Figure 11e: 511 S3: mirror 100% reflective in hatched area
Figure 11f: 512 S4: mirror 100% reflective in hatched area

METHOD AND SYSTEM FOR OPTICAL DISTANCE AND ANGLE MEASUREMENT

CROSS REFERENCE TO RELATED APPLICATIONS

This application is a continuation-in-part application of U.S. patent application Ser. No. 10/206,438, filed Jul. 26, 2002, which was a continuation-in-part application of application Ser. No. 09/476,392 filed Dec. 30, 1999 now U.S. Pat. No. 6,426,497 B1, entitled "Method and System for Optical Distance and Angle Measurement", issued Jul. 30, 2002, which are herein incorporated by reference in their entirety.

FIELD OF THE INVENTION

The present invention relates generally to the field of sensors, and more specifically, to the use of fiber optic sensors for determining spatial distance, speed and relative angular displacement of a moveable object.

BACKGROUND OF THE INVENTION

In the commercial and defense industries, users are demanding technology integration that increases product life, simplifies operation and maintenance, and provides integration that improves safety and reliability. However, any technology offered must also support a positive, quantitative cost/benefit analysis.

Fiber optic sensors have been used for the measurement of relative position for decades, but, until the present invention, their utility has not been extended to self-calibrating, precision absolute, position measurement systems. While conventional systems using fiber optic sensors offer only a relative measurement capability, they usually require repetitive calibration between uses because they are sensitive to the angle of the surface being measured and the distance between the sensor and the surface being measured. Indeed, some of those skilled in the art may believe that precision absolute position measurement systems could not be accomplished with fiber optic sensors.

Most sensor prognostic systems require exorbitant amounts of processing power for determining statistical probabilities or require precise measurements of physical properties for which current sensor technology does not exist. For example, in prognostic measurements of a moveable shaft (such as may be found in an aircraft engine or similar vehicle engine), the operational characteristics of the shaft must be known to ensure safe aircraft operation. Some operational characteristics required include monitoring of shaft lateral displacement, shaft misalignment, shaft speed and torque, all characteristics, which are difficult or impossible to capture with current non-contact sensor technology. These characteristics may be necessary to determine in such applications as turbogenerators, power generation stations, ships, submarines and earth moving equipment.

The need to measure drive shaft alignment has existed for some time. In flexible or fairly rigid structures, a moveable shaft (for example, one that is rotating) can move out of alignment, bend beyond its stress points or move off a set axis, thereby resulting in a damaged structure, engine or system. For example, aircraft safety depends in part on determining the drive's operational characteristics as torque is transmitted to any engine component. Further, the shaft's attitude and bending characteristics needs to be non-invasively measured, as well as the shaft's rotational speed and torque. Movement, either from the shaft attitude or the bending, needs to be measured to less than 0.01 inches (i.e., 10 mils) and the RPM and the torque further needs to be monitored.

Two known previous technical approaches to measuring and monitoring the shaft have been unsuccessful. For example, Lucent Technologies attempted to use an eddy-current sensor; however, measurements based on eddy-current sensing did not provide the accuracy, environmental tolerance, or robustness required for this or similar applications. Others have attempted a design concept that required a magnetic slug embedded in the torque couplers. However, this method similarly proved unsuccessful.

Thus, there is a need for a non-obtrusive system that optically measures movement of a large drive shaft or torque coupler in the confined space of an engine such as, for example, an aircraft. The sensor system must not interfere with airflow into the engine, and must accommodate various environmental conditions (such as, for example, high vibration, shock and high temperature conditions). Preferably, the sensor must also be placed between 150 mils and 500 mils from a surface of the face of the drive shaft or coupler assembly due to space constraints. The sensor system must also be capable of capturing absolute measurement of the shaft's movement without calibration. Moreover, the measurement data obtained by the sensor system should be capable of determining movement of 10 mils or less in the application as the shaft rotates up to 9000 revolutions per minute (RPM). The system should also preferably measure rotation of the shaft at greater than 9000 RPM as well as twisting of the moveable shaft in order to calculate torque. The system should also be able to measure absolute distance from each sensor to a surface on the torque coupler knowing that the surface may vary not only in axial distance away from the sensors but also in complex angles relative to the sensors. The ability to non-obtrusively measure absolute movement versus relative movement, high-resolution shaft displacement, and twisting in the moving shaft has never been accomplished before the present invention.

A self-calibrating, precision absolute position measuring system, such as disclosed in the present invention, is also supported by the defense community. The Secretaries of the Army, Navy, and Air Force have all directed, by policy, that new procurements must incorporate diagnostic and prognostic system health management prior to funding approval. This has been emphasized in new development programs including the Crusader for the Army, the Advanced Amphibious Attack Vehicle for the Marines, and the Joint Strike Fighter (JSF) for the joint services. However, until the present disclosure, there was a gap between the need and the technology available to meet that need.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention comprises a non-invasive precision, optical distance and angle measurement system which optically measures the position of a moveable object (such as a shaft in an engine), the bending of the moveable object, the torque applied to the object and the object's rotational velocity. The present invention includes a plurality of optic sensors placed around and adjacent to the object which transmit optic signals via fiber optic bundles to a target marker means on a surface of the object and receives the optic signals when the target marker means are sensed. The received optic signals are then processed by non-linear estimation techniques known to those of skill in the art to obtain the desired information. The present invention is intended for vehicular engines (such as are found in commercial or military aircraft), but can be applied to other applications, such as, for examples, in tanks, power generation equipment, shipboard power plants and other applications requiring moveable machinery.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 2 graphically illustrates the response curve from a commercially available fiber optic concentric ring-type sensor;

FIG. 3 is a three-dimensional plot of the response of a concentric ring fiber optic sensor. This shows the sensitivity of the sensor to distance and angle variations and shows the non-linear characteristics of the sensor to these variations.

FIG. 4b illustrates the multifaceted target markers as shown in FIG. 4a;

FIG. 11b through FIG. 11f depict the five mirror configurations required within alternate sensor assembly depicted in FIG. 11a.

DETAILED DESCRIPTION OF THE INVENTION

The present invention is a precision, non-invasive optical distance and angle measurement system which, by a plurality of sensor assembly means, transmits optical signals to predefined surface areas on a moveable torque coupler or like structure, measures the reflectance of the optical signals and by a signal processing software means which accounts for the sensor and target models, and processes the desired information relating to the shaft's operational characteristics.

Figure 1:
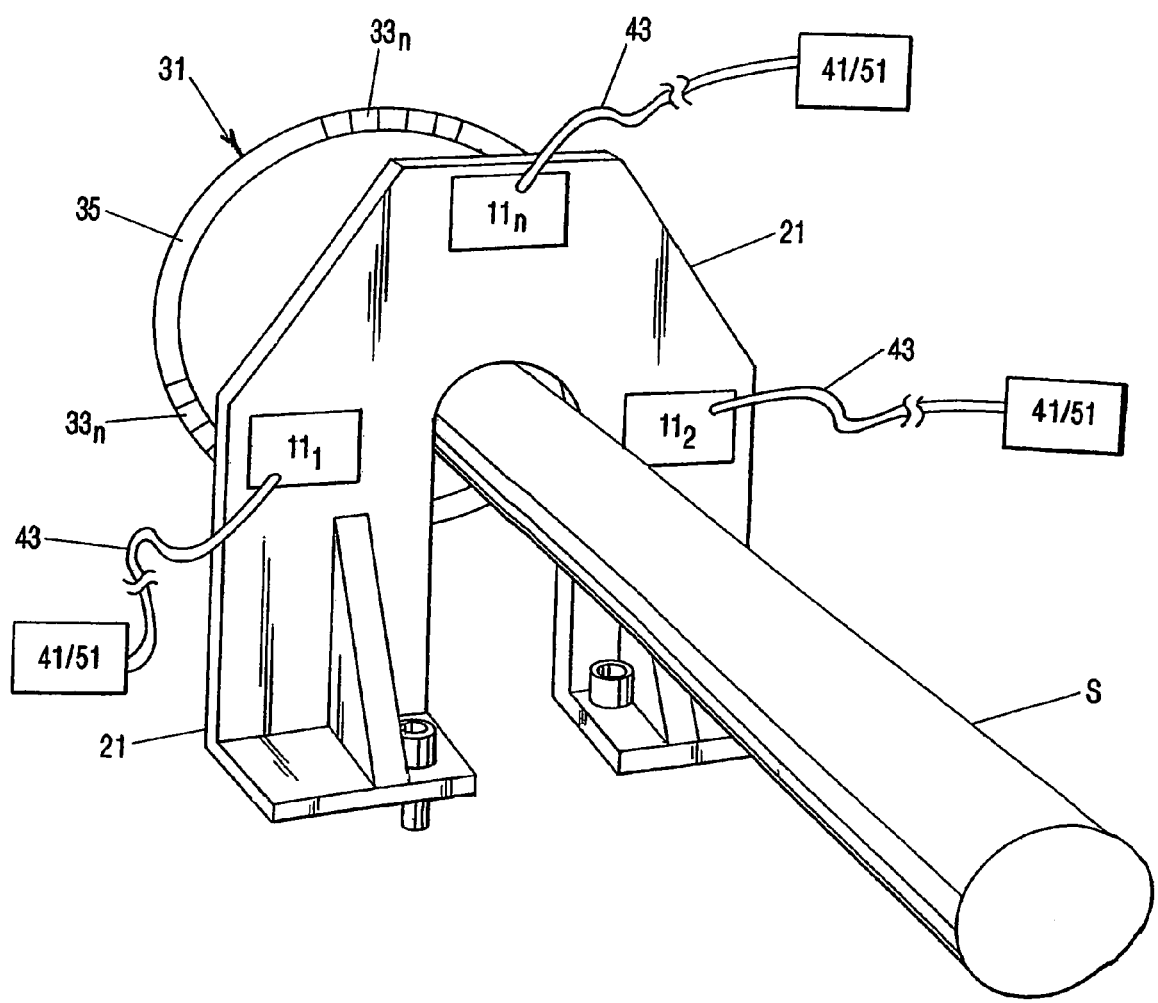
FIG. 1 is a side perspective view of one embodiment of the present invention attached to a mounting structure, which partially surrounds a moveable shaft attached to a torque coupler.
Figure 8:
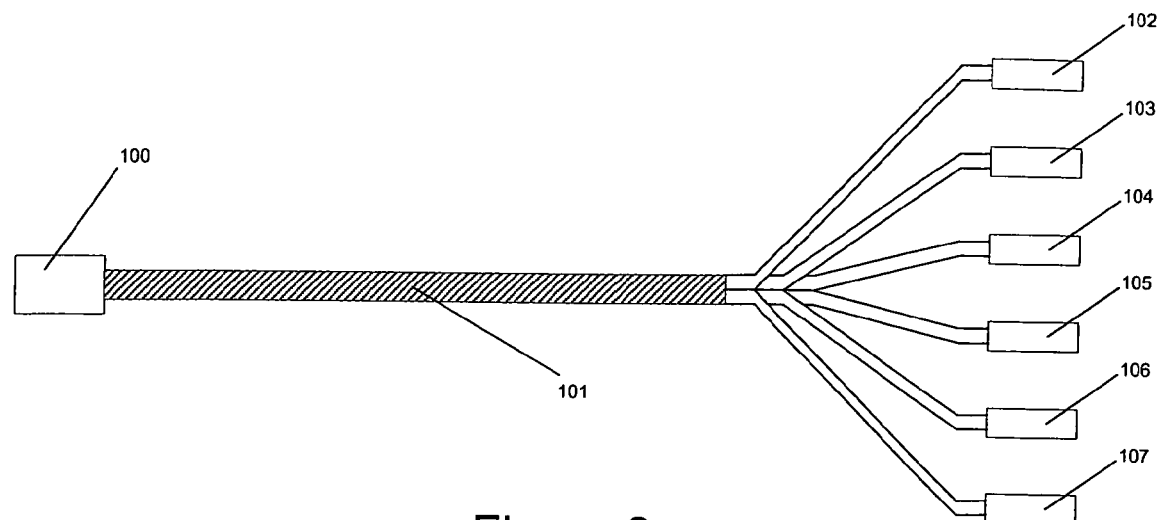
FIG. 8 is a diagram of another embodiment of the fiber optic sensor used as the means to measure absolute distance and planar angle.
Figure 9:
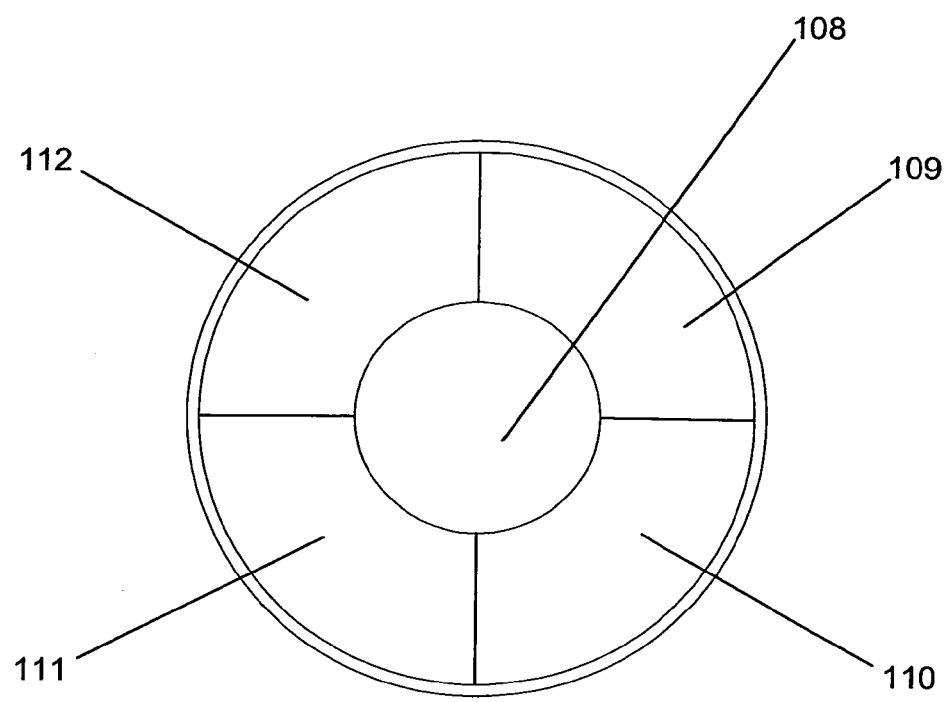
FIG. 9 depicts the unique configuration of the sensor head for the sensor embodiment of FIG. 8, which consists of a center transmit/receive fiber section surrounded by a plurality (4) receive fiber sections.

Referring to FIG. 1, the present invention includes a plurality of optic sensor assembly means $11_1$-$11_n$ placed on at least one mounting structure 21 adjacent to a torque coupler 31 which engages and surrounds a moveable shaft S; at least one stepped target marker means $33_n$ attached preferably to a surface 35 of the torque coupler 31 or alternatively directly to a surface of the shaft S; control electronics 41 communicating with each optic sensor assembly means $11_n$ via communications bus 43; and signal processing software means 51 loaded and stored in control electronics 41. A second embodiment of the system shown in FIG. 1, includes a sectioned sensor as depicted in FIGS. 8 and 9, which then allows use of a non-stepped or non-faceted target marker such as a polished uniform surface. The use of a non-faceted target enables the system to operate in environments where the target is attached to non-rotating machinery.

As seen in FIG. 1, each sensor assembly means $11_n$ is attached to a mounting structure 21 of conventional design, which is proximately adjacent to a torque coupler 31 attached to a moveable shaft S. Each sensor assembly means $11_n$ is preferably placed equidistantly on mounting structure 21 and thus, circumferentially around the moveable shaft S. In the preferred embodiment, three sensor assembly means $11_1$, $11_2$, $11_n$ are placed evenly around shaft S as seen in FIG. 1, however, those of skill in the art will realize that as little as two sensor assembly means could be used to accomplish the results dictated by the present invention. Each sensor assembly means $11_1$-$11_n$ is preferably disposed between 0.15 and 0.4 inches away from the surface face 35 of the moveable torque coupler 31. Each sensor assembly means $11_1$-$11_n$ is also preferably a conventional fiber optic concentric ring-type sensor, which has multiple fiber optic bundles per sensor, and more specifically, is a fiber-optic sensor which transmits optical signals to the surface 35 of the torque coupler 31, which receives optical signals from a target marker means $33_n$ formed on or attached to surface 35, and which transmits voltages corresponding to shaft information to the control electronics 41 for processing by the signal processing software means 51. The fiber optic sensor of FIG. 9 represents a variation of a concentric ring sensor, where additional sections are added to enable shaft information to be derived without requiring a stepped or multi-faceted target. In this embodiment, the concentric ring section 108 is surrounded by four receive fiber sections, 109, 110, 111, and 112. While these are preferred fiber optic sensor embodiments, those of skill in the art will realize that other sensors could be used (such as, for example and without limitation, other coherent light sensors, non-coherent light sensors, incandescent sensors, wide band sensors, multiple wavelength sensors or other fiber optic sensors) and remain within the spirit of this invention. As each target marker means $33_n$ rotationally passes each sensor assembly means $11_1$-$11_n$, each sensor assembly $11_1$-$11_n$ continuously, and thus in real-time, measures reflected light from the moveable surface 35 based on the intensity of the reflected transmitted optical signal when the transmitted signal reflects off of any of the target marker means $33_n$. Thus, in the preferred embodiment, three precise distances to the measured surface 35 can be obtained so that the attitude of the measured surface 35 (and thus, the coordinate plane of the coupler) can be estimated relative to a fixed reference coordinate system, thereby allowing direct measurements of the shaft's S coordinate angular displacement and distance from each sensor assembly means $11_1$ relative to each sensor assembly means $11_n$.

Typical concentric ring fiber optic sensors (such as the type preferred in the present invention) utilize a central bundle of illuminator transmit fibers surrounded by a concentric ring of sense fibers which are coupled to a photonic detector. Concentric ring fiber optic sensors can also consist of uniformly distributed transmit and receive fibers that are co-arranged in a circular section, as is embodied in the sensor configuration of FIGS. 8 and 9. Invasively moving the concentric ring sensor a distance relative to a reflective surface provides a detected response curve characteristic similar to that illustrated in FIG. 2. Applications which employ commercially available sensors that exhibit this type of response curve utilize only the linear portions near either side of the peak of this response curve as illustrated in FIG. 2, the linear range of a typical commercial fiber optic sensor being about 100 mils. However, use of the operational characteristics of the linear portion of this curve severely limits the operational range of the sensor assembly means, and further, provides no means for absolute calibration of the sensor. The present invention, in contrast, employs the non-linear operational characteristics of this curve for data processing by the signal processing software means 51.

Figure 12:
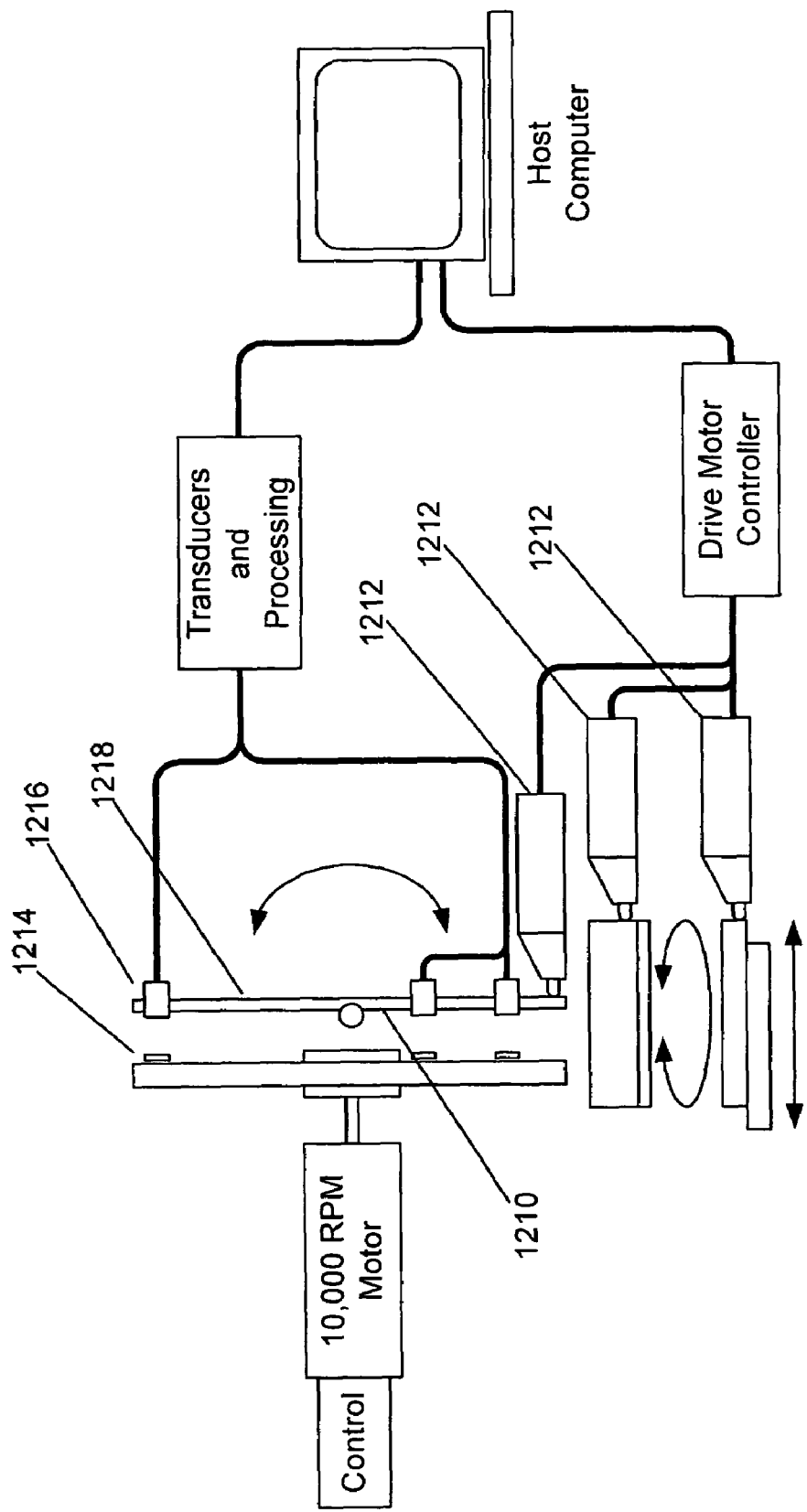
FIG. 12 shows the preferred calibration apparatus.

Referring to FIG. 3, FIG. 3 illustrates a three-dimensional plot of the response of a concentric ring fiber optic sensor of the type preferred in the present invention. As shown, this type of sensor is highly sensitive to angle variations, and thus, the effects of small angle changes on the characteristic response of such a sensor must be modeled in order to achieve the level of precision desired. The characteristic response is also a function of the reflecting surface material. Thus, when using these types of sensors, it is preferred that a three-dimensional response (or map) of each sensor first be captured and modeled. This can be accomplished, for example, by placing each sensor in an automated high precision fixture and capturing the response of each sensor from a known target material as the automated characterization system varies the distance and the two orthogonal angles of the sensor relative to the characterization target facet. FIG. 12 shows the preferred calibration configuration. The preferred calibration cradle 1210 consists of a precision machined device containing three motorized computer controlled micrometers 1212 that enable automated positioning of the sensor assembly 1216 relative to a target facet 1214. The automated sensor calibration configuration as shown in FIG. 12 has a two axis gimbal 1218 stage and a translation stage. Via automated algorithms, calibration cradle 1210 is precisely positioned while the five sensor voltages are collected for thousands of sensor head/target facet orientations. This collected data is the required input for the process of sensor calibration described below. This configuration provides two degrees of freedom in rotation and one in translation with sub-milliradian and sub-micron positioning resolution.

The calibration procedure does this by illuminating target facet 1214 and measuring the voltage responses from fiber bundles 108 through 112, calculating the ratios of the sum of 109 through 112 versus 108, 109 versus 111, and 110 versus 112 of FIGS. 8 and 9, and producing a map of each ratio as a function of the independently controlled sensor/target distance and two orthogonal angles. The three maps are then inverted so that the independent variables are the ratios and the dependent variables are the x, y, z parameters of target facet 1214, or equivalently, the target facet distance and two orthogonal angles by trigonometric calculations. Non-linear multi-dimensional polynomials are fitted to the inverted 3-dimensional surfaces and used in the real-time measurement system to avoid storing and performing multidimensional table lookups which significantly reduces memory requirements as well as computational loading on the processor.

The resulting mapped information can then be stored in the signal processing software means 51 for subsequent calculations or, for the fiber sensor embodiment of FIGS. 8 and 9, it can be used to derive the non-linear equations that represent the response of the sensor over the operating distance and planar angle range of the mapping process.

By involving ratios of the measured fiber bundle voltages collected from 108 through 112, the effects of sensor and environmental degradations such as dust, smoke, oil mist, target facet reflectivity, time, and component aging are mitigated over a very wide range of operating conditions. Once sensor mapping is performed via the calibration procedure, the sensor is able to accurately measure absolute angles and distances over a wide range of operating conditions and for multiple targets that have been subjected to various levels of degradation. This robustness and tolerance to environmental changes is a fundamental characteristic of this design.

Figure 4A:
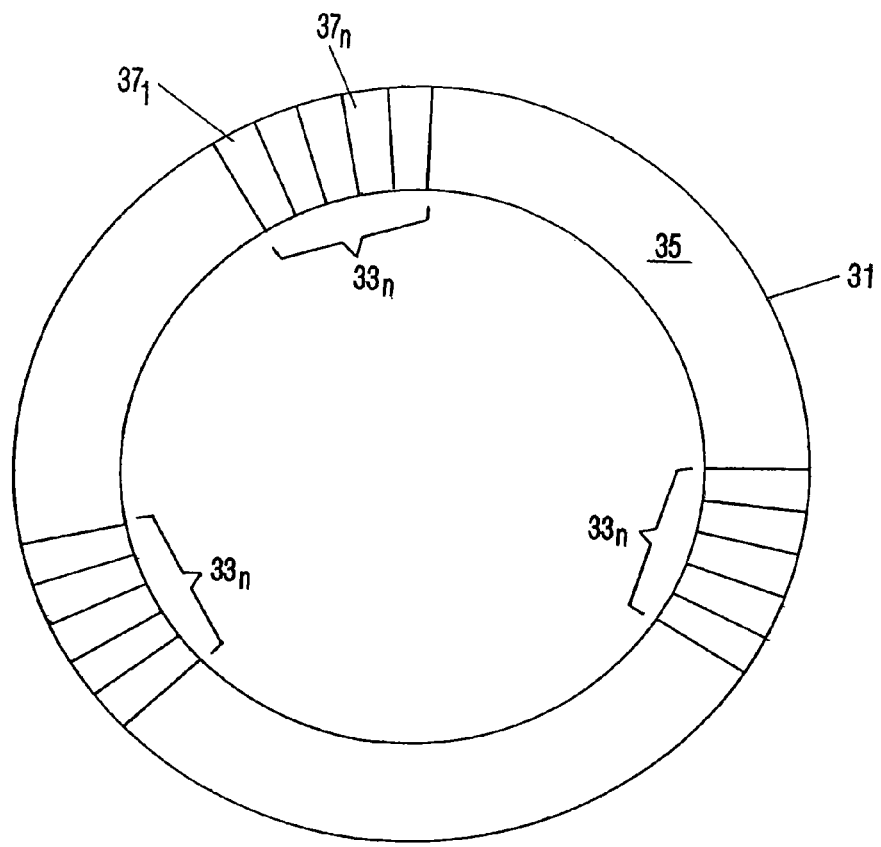
FIG. 4a is an end view of a torque coupler with attached multifaceted target markers, which, when the coupler moves, pass in front of sensor assembly means to provide signals for processing.
Figure 4B:
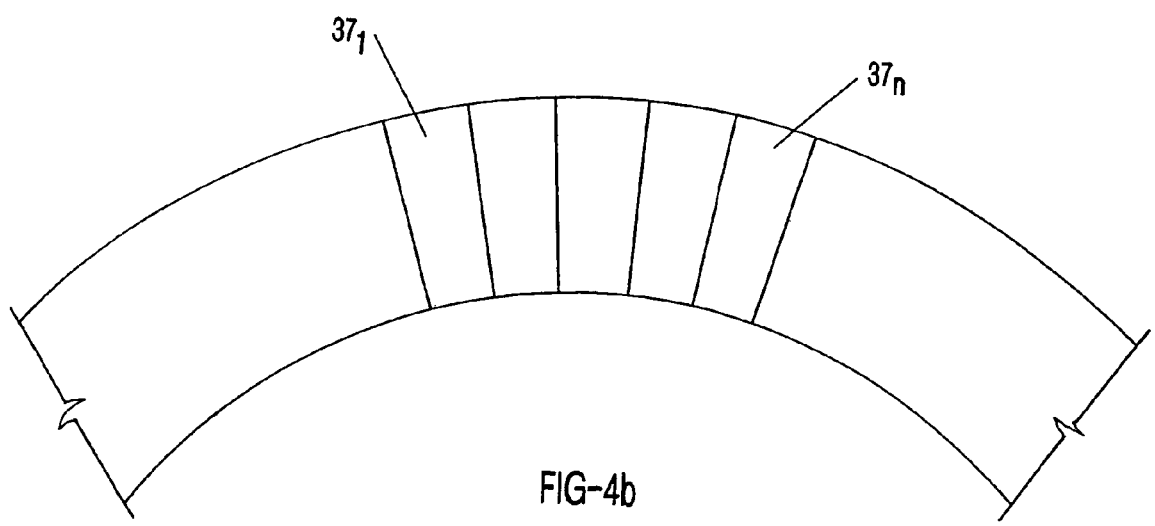
Figure 6:
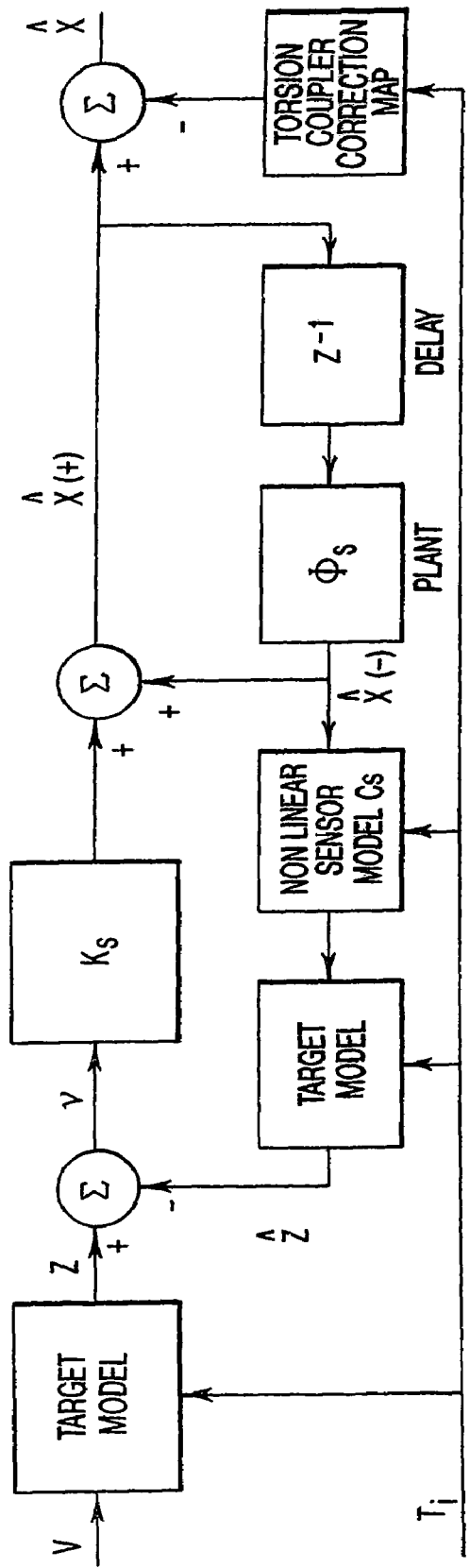
FIG. 6 is a system diagram illustrating a preferred sensor estimator shown in FIG. 5.
Figure 7:
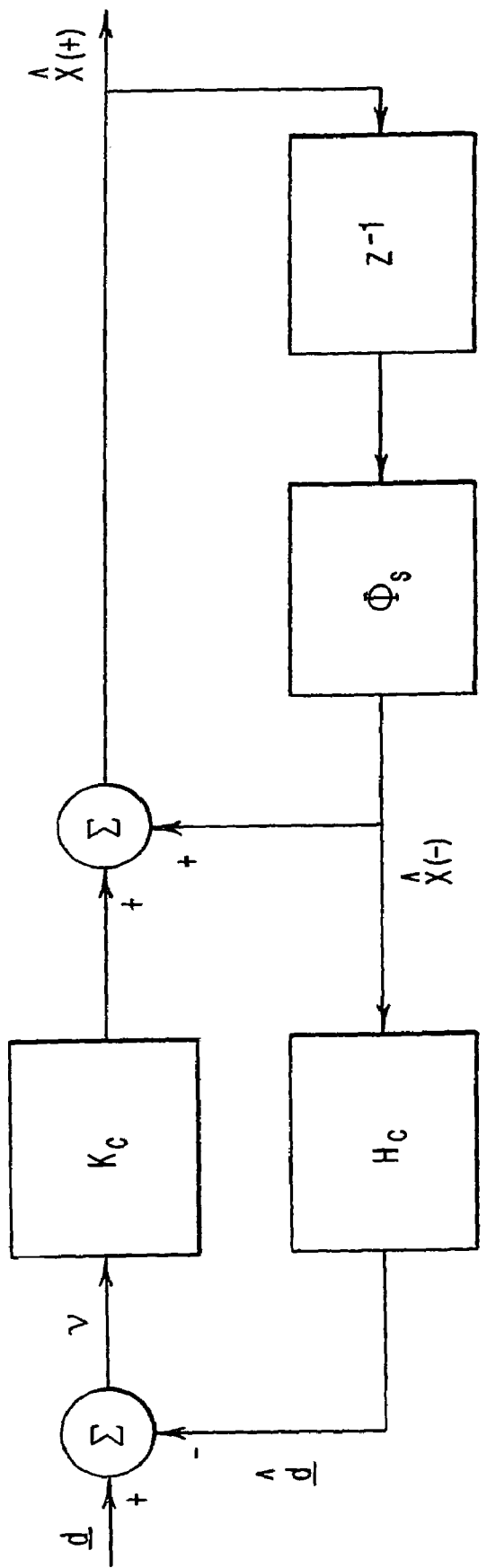
FIG. 7 is a system diagram illustrating a preferred torsion coupler plane estimator shown in FIG. 5.

At least one multifaceted target marker means $33_n$ is attached to a measured surface 35 of coupler 31 by conventional methods, and are spatially well distributed on surface 35 to allow the determination of the plane of surface 35, which in turn, allows the geometric determination of the angle of the shaft S. In the alternate fiber optic sensor embodiment of FIGS. 8 and 9, the target marker is not faceted, as the multiple sections of the sensor, 108, 109, 110, 111, and 112, facilitate absolute distance and angle measurement, which is facilitated by the multifaceted target means, 33, in the preferred embodiment. Preferably, each target marker means $33_n$ is spaced apart 120 degrees from each other on surface 35. Each target marker means $33_n$ is optically reflective, being able to reflect optical signals transmitted by each sensor $11_n$. In the preferred embodiment, each target marker means $33_n$ is of a predetermined height to an arbitrary center point C, is manufactured from a highly reflective compatible material (such as, for example, nickel-plated aluminum) and includes five faceted faces $37_1$-$37_n$, as seen in FIG. 4a. Using simulations, which model the sensor assembly means $11_n$ performance, it was determined that five facets would optimally allow the recursive sensor estimators (as seen in FIG. 6) to converge to a solution rapidly. The first three facets $37_1$-$37_3$ produce fixed, precise changes in displacement. The fourth facet $37_4$ produces a fixed, precise angle change in the axis of rotation of the coupler 31. The fifth facet $37_5$ produces a fixed, precise angle change in the axis perpendicular to the rotation of the coupler 31. In the alternate fiber optic sensor embodiment of FIGS. 8 and 9, the multi-section sensor head provides an equivalent capability as is provided by the multifaceted target and therefore, the sensor assembly 101, need only transmit and receive light from a reflective uniform surface, embodied in either a target marker or a polished area on the surface to be measured. Those of skill in the art will appreciate that many reflective materials could be substituted for the preferred embodiment of the target marker means of the present invention (such as, for example, nickel, aluminum, stainless steel, titanium and first surface or second surface glass mirrors), yet still remain within the spirit and the scope of the present invention. By tracking the location of each facet $37_n$ on surface 35 in space and time, a comparison can be made between measured voltages (which are proportional to the distance to the surface and the surface's angles) and a model of the sensor response for an estimated distance and angles (stored in control electronics 41) in order to calculate the coupler's 31 estimated absolute distance from each sensor $11_n$ and also the angle of each target marker means $33_n$ relative to each sensor $11_n$. In the alternate sensor embodiment of FIGS. 8 and 9, a set of signals used to compute absolute distance and angle are obtained from the light collected by the receive fibers in each section of the sensor, 108, 109, 110, 111, and 112. This embodiment is in contrast to having measurements from each of the facets.

The information corresponding to the captured signal reflectance from each sensor assembly means $11_n$ is then communicated via communications bus 43 (such as, for example, a fiber optic data bus or bundle) by the control electronics 41 to the signal processing software means 51. In the case of the second sensor assembly embodiment, the light is coupled to the transmit fibers through the transmit interface 102, which in turn is emitted from the head 100; the reflected light collected by the receive fibers of each section 108, 109, 110, 111, 112 and then converted to electrical signals by optical devices interfaced to the receive bundles 103, 104, 105, 106, and 107. The resulting voltages proportional to the light collected on each section can be transmitted to the signal processing means 51, in the same way as the first embodiment. The signal processing software means 51, in turn, is programmed by conventional means to determine whether the moveable shaft S is moving in any plane to within 10 mils over 450 mils and 0.1 degree over 2.5 degrees. Simultaneously, the signal processing software means 51 monitors the rotational speed of shaft S at up to 9000 RPM.

Figure 5:
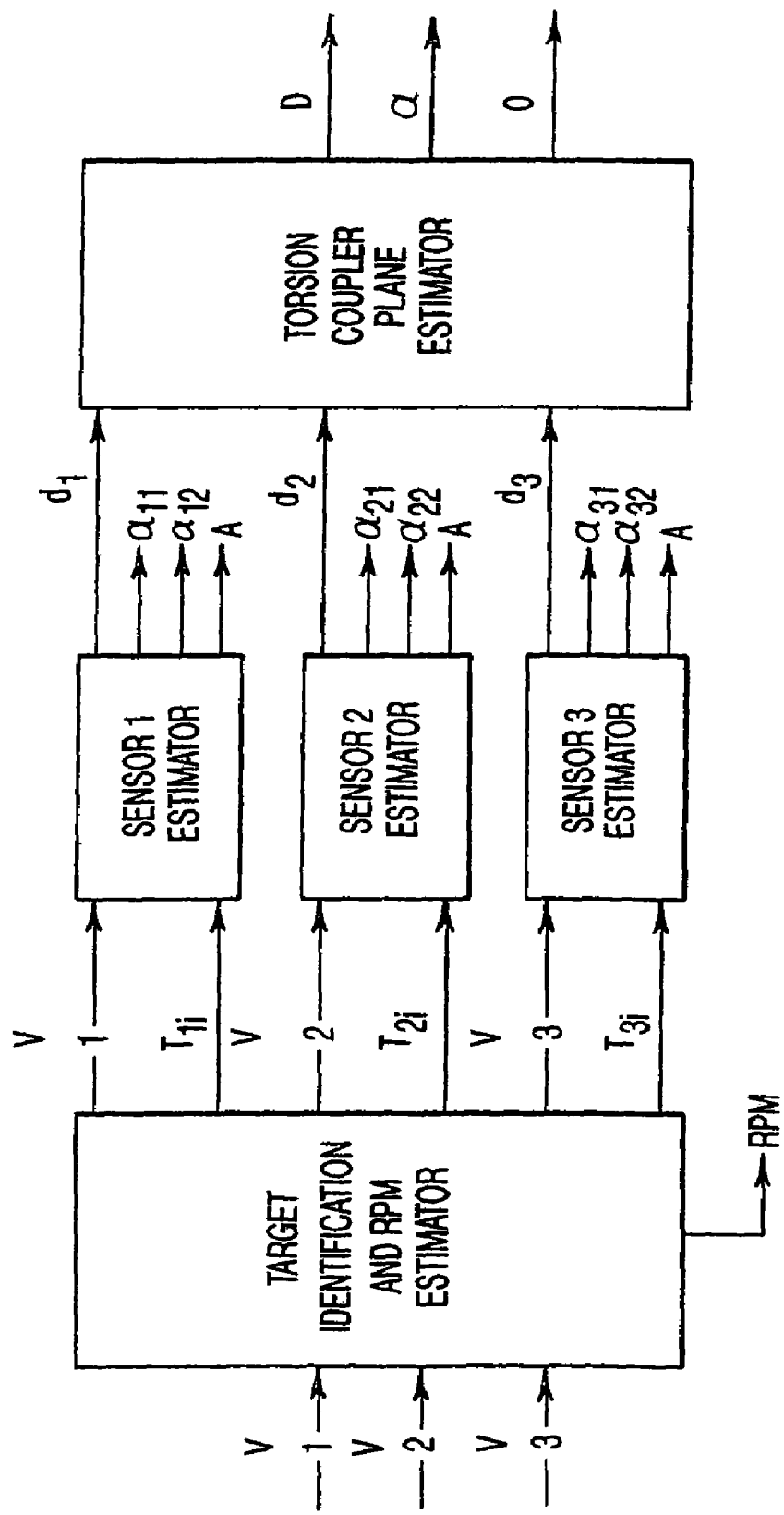
FIG. 5 is a block diagram of the signal processing functions required to derive the coupler attitude information from voltages sensed by the sensor assembly means as each target marker passes each sensor assembly means.

In the preferred embodiment of the present invention, as illustrated in FIG. 5, the signal processing software means 51 includes a target identification and RPM estimator 61, a plurality of sensor estimators $63n$ corresponding to each sensor assembly means $11_n$ employed, and a torsion coupler plane estimator 65.

In operation, each sensor assembly means $11_n$ generates a continuous signal obtained from reflections from the rim of the coupler 31 as the coupler 31 rotates. In the preferred embodiment of the present invention, the space (or, regions) between each target marker means $33_n$ on the rim of coupler 31 are typically darkened with non-reflective material. Thus, each target marker means $33_n$, as it rotationally passes each sensor, has a much higher return (or, reflected) signal. A small stripe of reflective material (not shown) is optionally placed on the rim of the coupler at a predetermined location to provide a fiducial mark on the rim of the coupler. The stripe provides a reference point for determining the rotational angle of the coupler. When the stripe is sensed by each sensor assembly means $11_n$, it is an indication that the next target market means $33_n$ sensed by the sensor assembly means $11_n$ will be target marker means $33_1$. This will be followed by target marker means $33_2$, $33_3$ up to $33_n$. The target identification and RPM estimator 61 computationally locates the fiducial marker, locates each target marker means, locates each facet of each target marker means, obtains the sensor response of each facet $37_n$ of each target marker means $33_n$ to transmit this data to the sensor estimators $63_n$, and by using the sampling rate of each sensor assembly means $11_n$, determines the rotational velocity of the shaft by the information corresponding to the passage of the fiducial marker on each rotation.

Referring now to FIG. 6, each sensor estimator $63_n$ correlates to each sensor assembly means $11_n$ employed, and computationally generates a distance and two orthogonal angle estimates based on voltages from the five facets $37_1$-$37_5$ of each of the target marker means $33_n$. In addition, in order to accommodate variations in the overall gain of the optics and electronics employed in the present invention, an attenuation parameter is also utilized in each sensor estimator $63_n$. Models of the characteristic responses of each sensor used (e.g., how they respond to predefined target marker means $33_n$) are necessary in order to recursively estimate these parameters and are stored within signal processing software means 51. Such models are derived by known methods of off-line characterization of each sensor assembly means $11_n$ employed.

As illustrated in FIG. 6, each sensor estimator $63_n$ compares the voltage response from each sensor assembly means $11_n$ obtained in response to reflected light from each facet $37_n$ to an estimated voltage measurement (being previously derived from models of the sensor and target) and multiplies the difference by a gain matrix. The gain matrix (being previously derived) should minimally account for the noise, target and sensor characteristics. The result is applied to the previous estimate of the state and a new estimate is produced. This new estimate of distance, angle, and attenuation is applied to the non-linear sensor model and subsequently, the target model to generate the next measurement estimate.

Torsion coupler plane estimator 65 takes three precise distances from the sensor estimators $63_n$ and uses these distances to determine the attitude of the coupler's 31 plane via a recursive Kaman estimator which is similar in form to that of the sensor estimators. Those skilled in the art will note that there are several methods to accomplish this method, however, the recursive Kaman estimator is preferred because it allows readings for the coupler plane to be continuously generated.

In the preferred embodiment, the signal processing software means is programmed to obtain the desired information in MatLab and Mathmatica by methods known to those of skill in the art. These software programming languages were used for prototype expediency, but those of skill in the art will appreciate that other methods may be used (such as, for example, by hardware means such as preprogrammed ASICS or by embedding the software in microcontrollers). Because each target marker means $33_n$ is coupled to the moveable coupler, the present non-invasive optical distance and angle measurement system allows collection of measurements multiple times per revolution in order to calculate the precise attitude, speed and torque of the moveable shaft S. As will now be appreciated by those of skill in the art, obtaining multiple measurements is especially useful in those applications where the measured surface or plane is not truly flat, and multiple measurements may help in mapping the uneven surface to an idealized coupler surface.

Further, the signal processing software means 51 is programmed to used the information from the reflected optical signals to automatically determine shaft characteristics, despite the conditions of the surrounding environment, by non-linear estimation of absolute displacement of shaft S and angular displacement of shaft S by light returned from the target marker means $33_n$. For example, the gradient of the reflected light intensity is influenced by many factors such as air quality, humidity, temperature, unexpected obstructions (including dust particles) the reflective quality of the target's surface, the light source's intensity and operational characteristics, and the angle of incidence on the target. Thus, in the preferred embodiment of the present invention, the signal processing software means 51 further includes signal processing means for providing an adaptive gain to accommodate variations in the optical path, sense electronics or fiber bundle variations.

In the alternate sensor assembly embodiment of FIGS. 8 and 9, the sensor emits light against the surface portion of the shaft, which is returned by the reflective non-faceted target markers or polished area on the surface. The voltages obtained from the light collected by the fibers in sections 108, 109, 110, 111, 112 of three sensors are input to the processing software means 113. The five voltages from the sections are then processed 114, 115, 116, 117, 118, 119, 120, 121, 122 to obtain three ratio measurements for each sensor. The polynomial fit representing the corresponding ratio response of the sensors against a known reflective material as a function of distance and angle is obtained through sensor characterization as described for the first embodiment. These ratios are then further processed by inversion polynomial estimators 123, 124, 125, 126, 127, 128, 129, 130, 131. The results of these computations are absolute distance and angle measurements, as is also obtained with the first embodiment.

Figure 10:
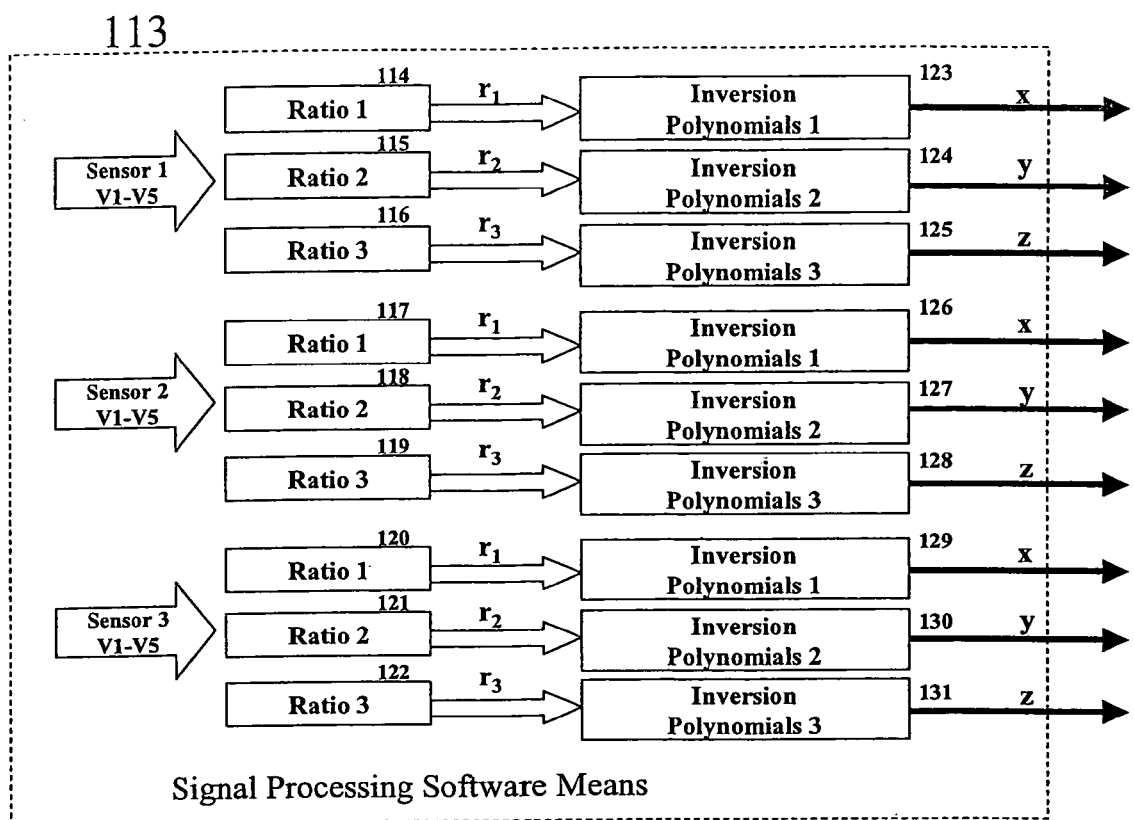
FIG. 10 depicts processing software required to compute the desired distance and angle measurements from the signals obtained from the sensor embodiment of FIGS. 8 and 9.
Figure 11A:
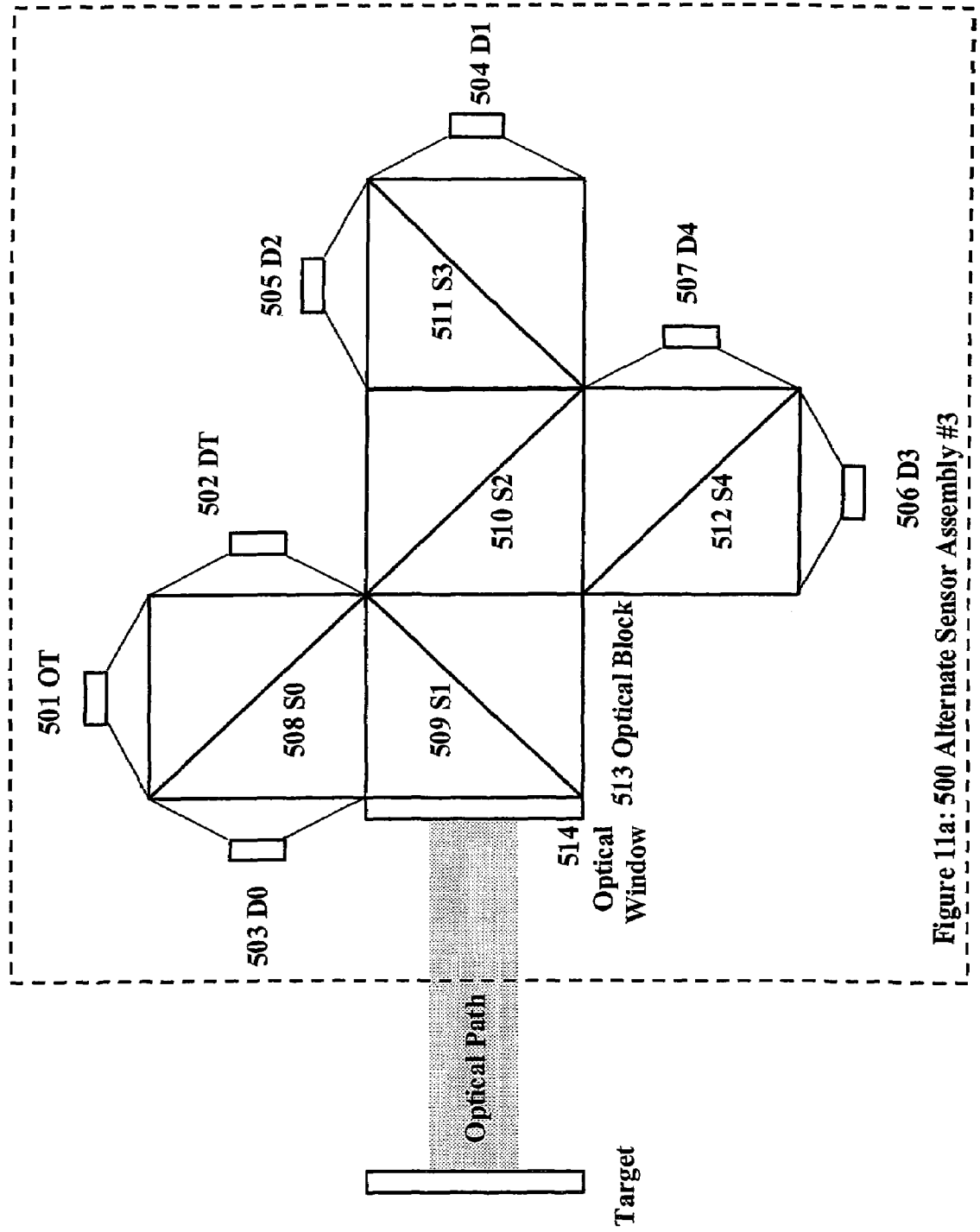
FIG. 11a depicts a third sensor assembly means of collecting required measurement voltages which is useful when the sensor assembly can be placed proximally to the target.

In the alternate sensor assembly embodiment of FIGS. 11a-11f, the sensor assembly 500, is positioned in close proximity to the sensed target eliminating the need for fiber optic transmissive cables. In this alternate sensor assembly, however, a means of transmitting an equivalent beam of light and separating out equivalent areas of light to those depicted in FIG. 9 is facilitated via alternate sensor assembly 500. Here, optical transmitter 501 generates a beam of light that is transmitted through 20% reflective mirrored surface 508 depicted in FIG. 11b and reflected by 100% reflective mirrored surface 509 depicted in FIG. 11c out the optical window 514 towards the previously described optical mirrored target. Light modified by the distance and angles of the target are reflected back through optical window 514 and into optical block 513 which contains mirrors 508-512 and detectors 503-507, which separate and detect the returning light in a manner equivalent to previously described methods which are depicted in FIGS. 9-10. Detector assemblies 502-507 preferably consist of commonly available diode detectors and associated collimating and aperture control elements. Mirrors 508-512 are typically first surface mirrors with percentage reflectivity and reflective patterns as depicted in FIGS. 11b-11f. Protective window 514 is comprised of elements that provide scratch resistance and other protective means to the optical block assembly 513 while also including antireflective coatings and optical bandwidth selectivity as is commonly practiced. Those skilled in the art will quickly realize that there are many alternative electro-optical assemblies that will capture equivalent measurement voltages including custom diode array assemblies as well as imaging methods utilizing optically focused CCD arrays and partitioning the array output in hardware and/or software in a manner equivalent to that depicted in FIG. 9.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a non-invasive precision, optical distance and angle measurement system, is followed.

What is claimed is:

1. A method for measuring an absolute distance and planar angles for an at least one object relative to an optic sensor assembly, the method comprising the steps of:
    a) calibrating the optic sensor assembly by mounting the optic sensor assembly in a fixture and capturing a response of each sensor from the optic sensor assembly from a known target;
    b) mounting a structure adjacent to the object;
    c) locating the calibrated optic sensor assembly upon the mounting structure, the calibrated optic sensor assembly comprising a plurality of at least four sensors;
    d) providing a transmitter for transmitting optic signals;
    e) locating at least one target on a surface portion of the object;
    f) using control electronics to communicate with the transmitter and each sensor of the calibrated optic sensor assembly by a communications bus, each sensor measuring an intensity of reflected light from the at least one target;
    g) processing measured reflected light intensity information and the captured response from each sensor of the calibrated optic sensor assembly by signal processing software means, loaded and stored in the control electronics; and
    h) computing the absolute distance and the planar angles; and
    i) repeating steps e) through h) for a next object.

2. The method of claim 1 wherein the step of providing a transmitter comprises providing the transmitter within the optic sensor assembly.

3. The method of claim 1 wherein the optic sensor assembly comprises a sectioned sensor assembly.

4. The method of claim 1 wherein the at least one target comprises a reflective surface.

5. The method of claim 1 further comprising directing the optic signals by the transmitter to a plurality of mirrored surfaces optically connected to the optic sensor assembly for separating predetermined areas of the optic signals to the at least one target and for detecting the optic signals from the at least one target.

6. The method of claim 1 further comprising the step of measuring an absolute distance and planar angles for a next object relative to the calibrated optic sensor assembly.

7. A system for measuring an absolute optical distance and planar angles for an at least one object relative to a plurality of sensors in an optic sensor assembly the system comprising:
    a means for calibrating each sensor in said optic sensor assembly, said optic sensor assembly comprising at least four optic sensors;
    a mounting structure affixed adjacent to the object;
    said optic sensor assembly disposed on the mounting structure;
    a transmitter for transmitting optic signals;
    at least one target disposed on a surface portion of the object for reflecting the transmitted optic signals;
    control electronics in communication with the transmitter and each sensor of the optic sensor assembly with a communications bus, said each sensor measuring an intensity of reflected light from the at least one target; and
    signal processing software means loaded and stored in the control electronics for processing measured reflected light intensity information from said each sensor of the optic sensor assembly, a calibrated response of each sensor and for computing the absolute distance and the planar angles.

8. The invention of claim 7 wherein said plurality of sensors comprises a sectioned sensor assembly.

9. The invention of claim 8 wherein the sectioned optic sensor assembly comprising a plurality of receiver sections comprises equally distributed sections with predetermined areas.

10. The invention of claim 8 wherein each of the sections of the plurality of sections comprise optical fiber.

11. The invention of claim 7 wherein said object comprises a stationary object.

12. The invention of claim 7 wherein said object comprises a moving object.

13. The invention of claim 7 wherein said at least one target comprises a predetermined area of the object.

14. The invention of claim 7 wherein said at least one target comprises a reflective surface.

15. The invention of claim 7 further comprising a plurality of mirrored surfaces optically connected to the optic sensor assembly for separating predetermined areas of light from the transmitter and for detecting the optic signals from the at least one target.

16. The invention of claim 7 wherein said means for calibrating comprises a fixture for placing said sensor assembly and a known target.

17. The invention of claim 7 further comprising the system for measuring an absolute optical distance and planar angles for a next object relative to the plurality of calibrated sensors in the optic sensor assembly.

* * * * *